United States Patent
Winterot et al.

(10) Patent No.: US 7,136,521 B2
(45) Date of Patent: Nov. 14, 2006

(54) OPTICAL ARRANGEMENT FOR PRODUCING STEREOSCOPIC IMAGES

(75) Inventors: Johannes Winterot, Jena (DE); Johannes Knoblich, Jena (DE); Bernd Meder, Westhausen (DE)

(73) Assignee: Carl Zeiss Jena GmbH, Jena (DE)

( * ) Notice: Subject to any disclaimer, the term of this patent is extended or adjusted under 35 U.S.C. 154(b) by 774 days.

(21) Appl. No.: 10/110,123

(22) PCT Filed: Aug. 2, 2001

(86) PCT No.: PCT/EP01/08936

§ 371 (c)(1),
(2), (4) Date: Aug. 29, 2002

(87) PCT Pub. No.: WO02/12924

PCT Pub. Date: Feb. 14, 2002

(65) Prior Publication Data

US 2003/0117702 A1    Jun. 26, 2003

(30) Foreign Application Priority Data

Aug. 4, 2000   (DE) ................................ 100 38 133

(51) Int. Cl.
*G06K 9/00*   (2006.01)
(52) U.S. Cl. ...................... 382/154; 359/622; 359/656; 396/106; 348/348
(58) Field of Classification Search ................ 359/689, 359/622, 656, 686, 676, 683, 708, 794; 348/348; 250/398, 201.2, 492.2; 396/106, 111, 121; 382/154
See application file for complete search history.

(56) References Cited

U.S. PATENT DOCUMENTS

| | | | | |
|---|---|---|---|---|
| 5,350,924 A | * | 9/1994 | Stengl et al. | 250/492.2 |
| 5,436,460 A | * | 7/1995 | Stengl et al. | 250/492.21 |
| 5,453,784 A | * | 9/1995 | Krishnan et al. | 348/348 |
| 5,793,524 A | | 8/1998 | Luloh | 359/381 |
| 6,044,232 A | * | 3/2000 | Pan | 396/330 |

FOREIGN PATENT DOCUMENTS

| | | |
|---|---|---|
| DE | 41 14 646 | 11/1982 |
| DE | 43 40 461 | 6/1995 |
| JP | 08-036134 | * 6/1996 |

* cited by examiner

Primary Examiner—Sheela Chawan
(74) Attorney, Agent, or Firm—Reed Smith LLP

(57) ABSTRACT

An optical arrangement for stereoscopic viewing of objects which is outfitted with an imaging system and with at least one lens group with a fixed focal length which is arranged between the imaging system and a viewed object for changing the imaging scale. This is achieved in that an adjusting device is provided for changing the position of the lens group in the direction of the optical axis and, accordingly, for changing the distance c between the lens group and a reference edge of the imaging system. This makes it possible to adjust different magnification $\beta'$ by actuating the adjusting device or changing the distance c and, therefore, to generate virtual intermediate images of objects located at various distances within a working range in the imaging plane of the stationary system. Accordingly, very advantageous applications are possible in restoration work, in dental engineering, and so on, in which the enhanced use value achieved by the invention is desired.

4 Claims, 2 Drawing Sheets

OPTICAL ARRANGEMENT FOR PRODUCING STEREOSCOPIC IMAGES

CROSS-REFERENCE TO RELATED APPLICATIONS

This application claims priority of International Application No. PCT/EP01/08936, filed Aug. 2, 2001 and German Application No. 100 38 133.2, filed Aug. 4, 2000, the complete disclosures of which are hereby incorporated by reference.

BACKGROUND OF THE INVENTION a) Field of the Invention

The invention is directed to an optical arrangement for stereoscopic viewing of objects which is outfitted with an imaging system and with at least one lens group with a fixed focal length which is arranged between the imaging system and a viewed object for changing the imaging scale.

b) Description of Relevant Principles and Art

Optical arrangements used for imaging objects have the possibility of focusing on these objects and adjusting the imaging focus. The apparatus provided for this purpose can be categorized according to three basic principles:

According to a first principle, the object and the imaging system are moved relative to one another for focusing; that is, either the imaging system is displaced in the direction of the object or, conversely, the object is displaced in the direction of the imaging system as, for example, in microscopes in which the objective is displaced based on the principle of objective focusing or the object support, or slide, with the object is moved based on the principle of table focusing.

In contrast, in a second principle, the focus adjustment is carried out with a constant distance between the object and imaging system in that an optical component of the imaging system is displaced axially relative to other components of the imaging system and the imaging system is accordingly focused on the object. Binoculars, photographic objectives and video cameras operate on this principle.

In optical arrangements based on a third principle, the transmission length is changed by an optical auxiliary system which is arranged between the object to be imaged and the imaging plane of the imaging system. In this way, the object position can be adapted to without intervention in the internal construction of the imaging system and without changing the position of the imaging system relative to the object. The invention described in the following must also be classed in this category.

Optical arrangements for stereoscopic imaging of objects in which, based on the third principle mentioned above, a supplementary optical system in the form of a lens group serving to change the imaging scale is positioned between a fixed imaging system and the object are known in the art.

Depending upon the particular application, such supplementary systems have a positive or a negative focal length. Greenough type microscopes in particular are outfitted with supplementary systems such as these. For example, the "DV 4" and "Stemi 2000" stereomicroscopes by Carl Zeiss Jena GmbH are known in which a fixed magnification factor is achieved with the supplementary system.

The use of supplementary systems is also known for telescope type stereomicroscopes, for example, the "TECHNIVAL" and "CITOVAL" stereomicroscopes described in Beyer/Riesenberg, "Handbook of Microscopy", Verlag Technik Berlin, third edition, 1998, 348ff. In this case, also, the transmission length is defined by the choice of magnification range and a change is possible only by changing the supplementary system or exchanging the base objective.

This is disadvantageous for applications in which a variable distance to the object to be viewed must be spanned by a stationary optical arrangement, which is required, for example, in restoration work. In this case, an upright, non-reversed image is needed, which can only be achieved with an imaging scale greater than "zero".

As is well known, either a real intermediate image or a virtual intermediate image is generated in the object plane of the stereomicroscope for this purpose. The invention described in the following is directed to the generation of virtual intermediate images.

OBJECT AND SUMMARY OF THE INVENTION

Based on the prior art described above, it is the primary object of the invention to further develop arrangements for stereoscopic imaging of objects of the type described above in such a way that the working distance from the object to be viewed can be varied in a simple manner and which accordingly makes it possible to observe objects at various distances without fatigue.

According to the invention, this object is met in that an adjusting device is provided for changing the position of the lens group in the direction of the optical axis and, accordingly, for changing the distance c between the lens group and a reference edge of the imaging system.

This makes it possible to adjust different magnifications $\beta'$ by actuating the adjusting device or changing the distance c and, therefore, to generate virtual intermediate images of objects located at various distances within a working range in the imaging plane of the stationary system. Accordingly, very advantageous applications are possible in restoration work, in dental engineering, and so on, in which the enhanced use value achieved by the invention is desired.

The change in the transmission length caused by changing the distance c by an amount $\Delta c$ depends upon the focal length of the lens system and, therefore, upon the initial magnification $\beta'$ and causes a change in magnification toward $\beta'=1$. An especially advantageous action results with a relatively small initial magnification $\beta'$.

A change in magnification $\beta'$ or focus displacement takes place for all focal lengths $f_{group}$ when the lens group is positioned between the imaging system and the focal plane of the imaging system. The greatest dynamics result from changing the back focal distance a at a maximum distance c.

In a particularly advantageous construction of the invention, the lens group comprises two lenses with the following characteristics:

radii of the optically active interfaces or boundaries:
$R_1=-67.722$ mm; $R_2=56.249$ mm; $R_3=-3867$ mm;

vertex distances of the optically active boundaries on the optical axis: $D_1=2.8$ mm; $D_2$—5.75 mm;

principal wavelength $\lambda$—546 nm;

refractive indices for the principal wavelength: $Ne_1=1.60629$; $Ne_2=1.65285$ dispersion (Abbe number): $ve_1=53.35$; $ve_2=33.59$.

When a lens group of this kind is placed in front of the imaging system, changes in magnification $\beta'$ or in focal distances a and b can be achieved in the following way by varying the distance c:

| Distance c | Magnification β' | Back focal distance a | Object focal distance b | Distance A |
|---|---|---|---|---|
| $c_1$ | 0.3 | $a_1 = 93.74$ | $b_1 = 294.5$ | — |
| $c_2$ | 0.4 | $a_2 = 81.04$ | $b_2 = 189.1$ | $A_2 = 92.7$ |
| $c_3$ | 0.5 | $a_3 = 69.27$ | $b_3 = 125.9$ | $A_3 = 144.13$ |

In a particularly preferable manner, the optical arrangement according to the invention is constructed as a Greenough type stereomicroscope and the lens group, including the adjusting device, is adapted to the base body of the stereomicroscope.

The invention will be described more fully in the following with reference to an embodiment example.

DESCRIPTION OF THE PREFERRED EMBODIMENTS

Figure 1:
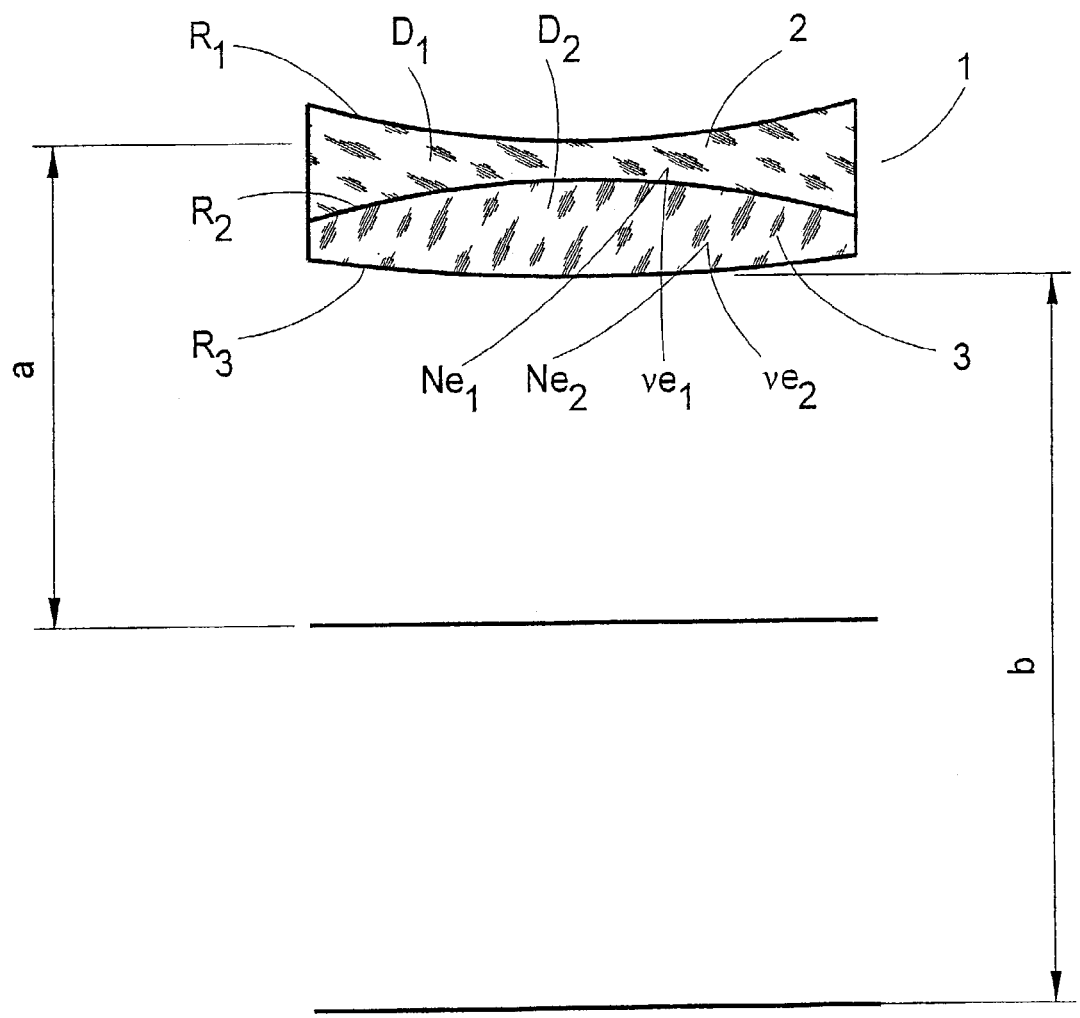
FIG. 1 shows the example of a lens group comprising two lenses, designed for a Greenough stereomicroscope.

FIG. 1 shows the lens group 1 comprising two lenses 2 and 3. The lens group 1 has a negative focal length and is designed and achromatized for the principal wavelength λ=546 nm. The optically active boundaries of the lens 2 have radii $R_1$=—67.722 mm and $R_2$=56.249 mm. Lens 3 is constructed with radii $R_2$=56.249 mm and $R_3$=−3867 mm. The vertex distances of the optically active boundaries on the optical axis are $D_1$=2.8 mm for lens 2 and $D_2$=5.75 mm for lens 3.

Further, the material of lens 2 has an index of refraction of $Ne_1$=1.60629 and a dispersion of $ve_1$=53.35. These characteristic values are $Ne_2$=1.65285 and $ve_2$=33.59 for lens 3.

Figure 2:
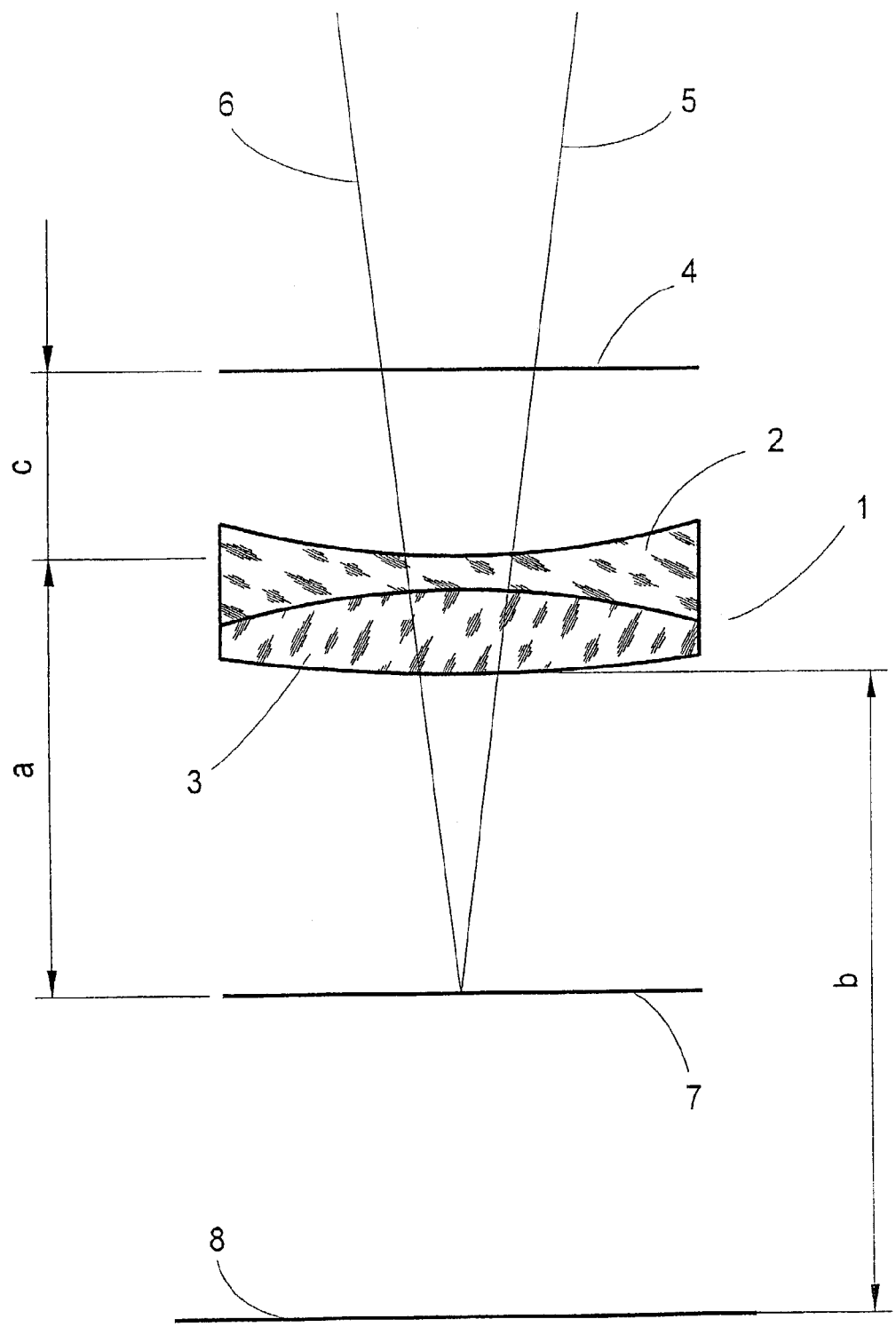
FIG. 2 is a schematic view showing the positioning of the lens group between the imaging system and object of a Greenough stereomicroscope.

FIG. 2 shows how the lens group 1 is positioned relative to object 8 and microscope beam paths 5 and 6. The position of a reference edge 4 at the imaging system is indicated in the form of a working line.

The sum c+a is constant and is determined by the free working distance of the imaging system. The distance c between reference edge 4 and lens group 1 is variable, wherein an adjusting device, not shown in the drawing, is used for changing the position of the lens group 1. Adjusting devices of this kind and their coupling to optical subassemblies which are variable in position are adequately known so that a more detailed description can be dispensed with.

For purposes of explaining operation, the drawing also shows the axial distance a between the vertex plane of the lens group 1 and the image plane 7 in which the optical system generates the image of an object 8 to be observed. The distance between the lens group 1 and the object 8 is designated as distance b. In this case, distance a corresponds to the back focal distance and distance b corresponds to the object focal distance.

The quantities for distances a and b are associated by the following equations:

$$|1/(-a_1-k_1)-1/(b_1-k_2)-1/f'_{group}|<0.02 \qquad (I)$$

$$|-(-a-k_1)/(b-k_2)-\beta|<0.02$$

with constants $k_1$ and $k_2$ and focal length $f'_{group}$ similar to the paraxial equations. Equation (I) defines the capture area, equation (II) formulates the dynamics of the magnification when the transmission length is changed. For the present example: $k_1$=−2.52, $k_2$=−3.29 and $f'_{group}$=−126.01.

The distance A between the reference edge 4 and the object 8 is defined by $A=c+b+D_1+D_2$ (see FIG. 2). When objects located at different distances $A_2$ or $A_3$ are to be observed, for example, the optical imaging can be adapted, according to the invention, to the different distances A by actuating the adjusting device, i.e., by varying the distance c.

For example, when adjusting to distance $c_1$, an object is focused with magnification β'=0.3. In order to view an object which is located, for instance, at a distance from the reference edge 4 that is smaller by the amount $A_2$=92.7, this object is focused with a magnification β'=0.4 as can be seen from the following table which is also contained in claim 3:

| Distance c | Magnification β' | Back focal distance a | Object focal distance b | Distance A |
|---|---|---|---|---|
| $c_1$ | 0.3 | $a_1 = 93.74$ | $b_1 = 294.5$ | — |
| $c_2$ | 0.4 | $a_2 = 81.04$ | $b_2 = 189.1$ | $A_2 = 92.7$ |
| $c_3$ | 0.5 | $a_3 = 69.27$ | $b_3 = 125.9$ | $A_3 = 144.13$ |

Accordingly, depending on the given working distance between the observer and the object or depending on the object focal distance b, the distance c can be changed within an area which causes a change in the imaging scale by a factor of 0.3 in $b_1$, by a factor of 0.4 $b_2$ and by a factor of 0.5 in $b_3$.

The term "imaging scale" is used in the preceding description of the invention in the sense of the size ratios of the intermediate image and object.

The arrangement according to the invention also enables observation when the focusing principles (change in the distance between the imaging system and object) which are conventional per se in stereomicroscopes are not applicable, as is frequently the case in restoration work, for example.

Therefore, as was described above with reference to an embodiment example of the invention, application of a variable supplementary system for bridging variable transmission lengths is preferred for restoration work and also in process monitoring with fixed instrument assemblies. Further, it is advantageously used when objects of various sizes are observed and documented successively in time in the fields of quality control, botany, criminalistics, and the like. The lens group (1) is preferably designed for a focal length range $f'_{group}$ of $$-0.75 \le \frac{a_1}{f'_{group}} \le 1.4$$

with the greatest possible back focal distance $a_1$.

While the foregoing description and drawings represent the present invention, it will be obvious to those skilled in the art that various changes may be made therein without departing from the true spirit and scope of the present invention.

| Reference Numbers | |
|---|---|
| 1 | lens group |
| 2, 3 | lens |
| 4 | reference edge |
| 5, 6 | microscope beam path |
| 7 | image plane |
| 8 | object |
| a, b, c | distance |
| $R_1, R_2, R_3$ | radius |
| $D_1, D_2$ | vertex distance |
| $N_1, N_2$ | index of refraction |
| $v_1, v_2$ | dispersion |

The invention claimed is:

1. An optical system for stereoscopic viewing of objects comprising:
   an imaging system; and
   at least one lens group with a fixed focal length which is arranged between the imaging system and a viewed object for changing the imaging scale;
   said at least one lens group and its position relative to the imaging system being designed for generating a virtual intermediate image; and
   an adjusting device being provided for changing the position of the lens group in the direction of the optical axis and, accordingly, for changing the distance c between the imaging system and the lens group, so that the imaging scale is variable in ranges greater than "zero".

2. The optical system according to claim 1, wherein the following changes in magnification and in focal distances occur by changing the distance c:

| Distance c | Magnification $\beta'$ | Back focal distance a | Object focal distance b | Distance A |
|---|---|---|---|---|
| $c_1$ | 0.3 | $a_1 = 93.74$ | $b_1 = 294.5$ | — |
| $c_2$ | 0.4 | $a_2 = 81.04$ | $b_2 = 189.1$ | $A_2 = 92.7$ |
| $c_3$ | 0.5 | $a_3 = 69.27$ | $b_3 = 125.9$ | $A_3 = 144.13$. |

3. The optical system according to claim 1, wherein the lens group comprises two lenses with the following characteristics:
   radii of the optically active boundaries: $R_1 = -67.722$ mm; $R_2 = 56.249$ mm; $R_3 = -3867$ mm;
   vertex distances of the optically active boundaries on the optical axis: $D_1 = 2.8$ mm; $D_2 = 5.75$ mm;
   principal wavelength $\lambda = 546$ nm;
   refractive indices for the principal wavelength: $Ne_1 = 1.60629$; $Ne_2 = 1.65285$
   dispersion (Abbe number): $ve_1 = 53.35$; $ve_2 = 33.59$.

4. The optical system according to claim 1, constructed as a stereomicroscope, wherein the lens group, including the adjusting device for changing distance c, is adapted to the base body of the stereomicroscope.

* * * * *